(12) United States Patent
Sturgeon et al.

(10) Patent No.: US 6,721,059 B1
(45) Date of Patent: Apr. 13, 2004

(54) METHOD AND APPARATUS FOR AUTOMATICALLY HANDLING FAXES

(75) Inventors: Derrill Sturgeon, Spring, TX (US);
John Barker, Houston, TX (US);
Kevin J. Brusky, Magnolia, TX (US)

(73) Assignee: Hewlett-Packard Develpoment Company, L.P., Houston, TX (US)

( * ) Notice: Subject to any disclaimer, the term of this patent is extended or adjusted under 35 U.S.C. 154(b) by 0 days.

(21) Appl. No.: 09/365,092

(22) Filed: Jul. 30, 1999

(51) Int. Cl.⁷ ............................................. G06F 15/00
(52) U.S. Cl. ...................................... 358/1.15; 358/468
(58) Field of Search ............................... 358/1.15, 1.16, 358/440, 434, 442, 444, 468; 379/100.01

(56) References Cited

U.S. PATENT DOCUMENTS

| | | | | |
|---|---|---|---|---|
| 5,162,924 A | * | 11/1992 | Saito | 358/440 |
| 5,274,467 A | * | 12/1993 | Takehiro et al. | 358/440 |
| 5,349,447 A | * | 9/1994 | Kuwahara et al. | 358/404 |
| 5,351,289 A | * | 9/1994 | Logsdon et al. | 379/142 |
| 5,416,725 A | * | 5/1995 | Pacheco et al. | 364/514 |
| 5,546,447 A | * | 8/1996 | Skarbo et al. | 379/142 |
| 5,644,629 A | * | 7/1997 | Chow | 379/142 |
| 5,724,408 A | * | 3/1998 | Morganstein | 379/88 |
| 5,991,367 A | * | 11/1999 | Robuck | 379/88.24 |
| 6,057,942 A | * | 5/2000 | Sato | 358/435 |
| 6,198,812 B1 | * | 3/2001 | Weber | 379/142 |
| 6,327,343 B1 | * | 12/2001 | Epstein et al. | 379/88.01 |
| 6,359,978 B1 | * | 3/2002 | Bradly | 379/211.02 |
| 2001/0040946 A1 | * | 11/2001 | Kenmochi et al. | 379/100.16 |

* cited by examiner

Primary Examiner—Mark Wallerson (57) ABSTRACT

A fax device having a memory for storing a list of blocked callers and the capability to receive caller identification information. As calls are received the fax device compares the caller identification information of the incoming call to the list of blocked callers. If the telephone number of the incoming call is contained in the list of blocked callers, a connection is denied. If the number is not contained in the list, the call is connected. The list of blocked callers may be automatically maintained by monitoring incoming calls for frequency, date, time and number of pages. The factors may be combined to determine a usage value. If the usage value exceeds a predetermined threshold, the incoming telephone number may be added to the list of blocked callers. A list of trusted callers prevents trusted phone numbers from accidentally being added to the blocked list. A list of urgent callers includes actions such as forwarding and messaging to determine how to handle a received fax from a certain number.

31 Claims, 9 Drawing Sheets

METHOD AND APPARATUS FOR AUTOMATICALLY HANDLING FAXES

BACKGROUND OF THE INVENTION

1. Field of the Invention

The present invention relates generally to a method and apparatus for handling faxes with a stand-alone facsimile machine or personal computer (PC) having facsimile capabilities, and more particularly to blocking inbound faxes using caller identification and forwarding or messaging in response to an inbound fax using caller identification.

2. Description of Related Art

Facsimile (fax) machines are a widely used communications device for most businesses and even many families. Most fax machines are stand-alone devices while others may be part of a multi-function peripheral or personal computer.

Typically, once these devices are setup and powered on they remain powered-up until service, repair or relocation takes them off-line. This is particularly true with stand-alone fax machines.

In any case, fax machines are expected to receive faxes at any time of the day or night. While this is extremely useful, it does leave a communications medium open for unsolicited faxes. When these unwanted faxes contain many pages or are sent frequently, the fax machine is unavailable for more important tasks. Additionally, the unsolicited faxes prematurely exhaust paper and toner or ink supplies. It is therefore desirable to reduce or eliminate the unsolicited faxes so that the fax machine is available for useful work.

SUMMARY OF THE INVENTION

A fax device for receiving and sending faxes includes a memory (e.g. non-volatile memory) and a fax controller coupled to the memory. The memory may contain a list of caller identification information. The fax controller may be configured to receive call identification information from a network (e.g. telecommunications network) corresponding to an incoming call and determine how to handle the incoming call based on the list of caller identification information.

The list of caller identification information may include a list of blocked callers and the fax controller may not answer the call if the caller identification information from the network matches information in the list of blocked callers. Alternatively, the fax controller may answer and quickly disconnect the call if the caller identification information from the network matches in the list of blocked callers. If the caller identification information corresponding to the incoming call matches information in the list of blocked callers, the fax controller will answer and process the call.

The memory also may include a list of trusted callers and a list of frequent callers. The fax controller is further configured to add the incoming call to the list of frequent callers if the number corresponding to the incoming call is not present in the list of trusted callers. The fax controller is further configured to add the incoming call to the list of blocked callers if the number corresponding to the incoming call is not present in the list of trusted callers and a usage value is exceeded.

Usage values distinguish unsolicited faxes from routine faxes based on caller frequency, date, time and number of fax pages. The list of frequent callers includes the frequency, date, time and number of fax pages for each call received.

The memory also may include a list of urgent callers. The urgent caller list includes at least one action to be taken when a call to the incoming caller identification information is received. The fax controller is further configured to process the call according to the list of urgent callers if the caller identification information from the network matches information in the list of urgent callers. The actions may include forwarding the call, calling a pager, calling a voice mailbox, calling a mobile phone and sending an email.

A method of handling incoming calls to a fax device is also disclosed. The method may include developing a list of caller identification information; receiving caller identification information from a network during an incoming call; and determining how to handle the incoming call based on the list of caller identification information.

The list of caller identification information may include a list of blocked callers and the determining step may include comparing the caller identification information receiving during the incoming call to the list of blocked callers; and refusing to answer the incoming call if the caller identification information matches information in the list of blocked callers. Alternatively, the determining step may include comparing the caller identification information receiving during the incoming call to the list of blocked callers; and answering and quickly disconnecting the incoming call if the caller identification information matches information in the list of blocked callers. If the caller identification information does not match a number in the list of blocked callers, the call is answered.

The method may also include developing a list of trusted callers and a list of frequent callers; and adding the caller identification information of the incoming call to the list of frequent callers if the caller identification information received from the network is not present in the list of trusted callers. The method may also include adding the caller identification of the incoming call to the list of blocked callers if the number is not present in the list of trusted callers and a usage value is exceeded.

The method may also include developing a list of urgent callers and processing the call according to the list of urgent callers if the caller identification information from the network matches information in the list of urgent callers. The list of urgent callers includes at least one action to be taken when a call corresponding to the caller identification information is received.

A computer system for connecting to a telephone line to receive faxes is also disclosed. The computer system may include a processor; a memory coupled to the processor and containing a list of caller identification information; and a fax device coupled to the memory and the processor. The fax device may receive caller identification information from the network corresponding to an incoming call and determine how to handle the incoming call based on the list of caller identification information.

The list of caller identification information may include a list of blocked callers and the fax device may not answer the call if the caller identification information from the network matches information in the list of blocked callers. Alternatively, the fax device may answer and quickly disconnect the call if the caller identification information from the network matches in the list of blocked callers. If the caller identification information corresponding to the incoming call matches information in the list of blocked callers, the fax device will answer and process the call.

The memory also may include a list of trusted callers and a list of frequent callers. The fax device is further configured to add the incoming call to the list of frequent callers if the number corresponding to the incoming call is not present in the list of trusted callers. The fax device is further configured to add the incoming call to the list of blocked callers if the number corresponding to the incoming call is not present in the list of trusted callers and a usage value is exceeded.

The memory also may include a list of urgent callers. The urgent caller list includes at least one action to be taken when a call to the incoming caller identification information is received. The fax device is further configured to process the call according to the list of urgent callers if the caller identification information from the network matches information in the list of urgent callers.

A fax device for coupling to a telephone line is also disclosed. The fax device may include a means for storing a list of caller identification information; means for receiving caller identification information from the telecommunications line during a call; and means for determining how to handle the incoming call based on the list of caller identification information.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS.

Figure 1A:
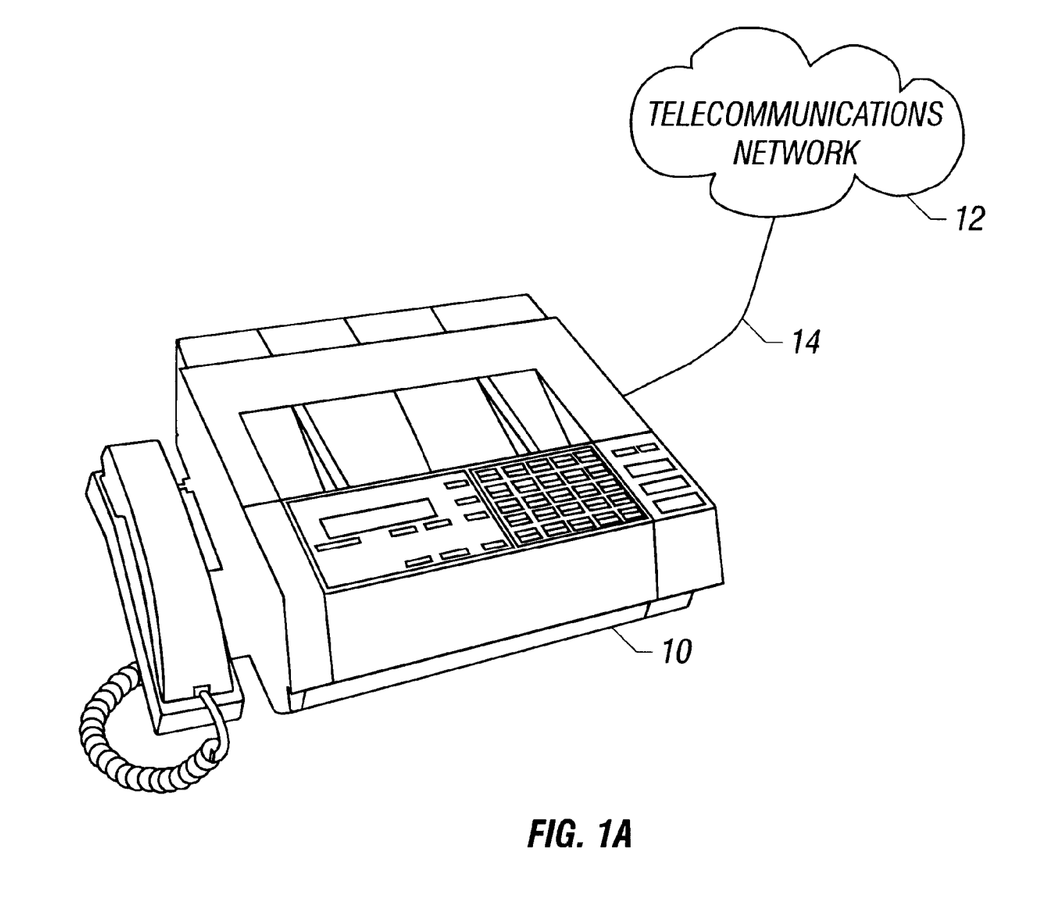
FIG. 1A is a diagrammatical representation of a stand-alone fax machine according to the preferred embodiment.

Referring first to FIG. 1A, there is illustrated a stand-alone fax machine 10 (i.e. a fax device) connected to a telecommunications network 12 (e.g. the public switched telephone network or Internet Protocol network) by a communications line 14 according to a preferred embodiment. The communications line 14 is preferably a standard telephone line. The fax machine 10 includes scanning, printing and transmission functions necessary for faxing.

Figure 1B:
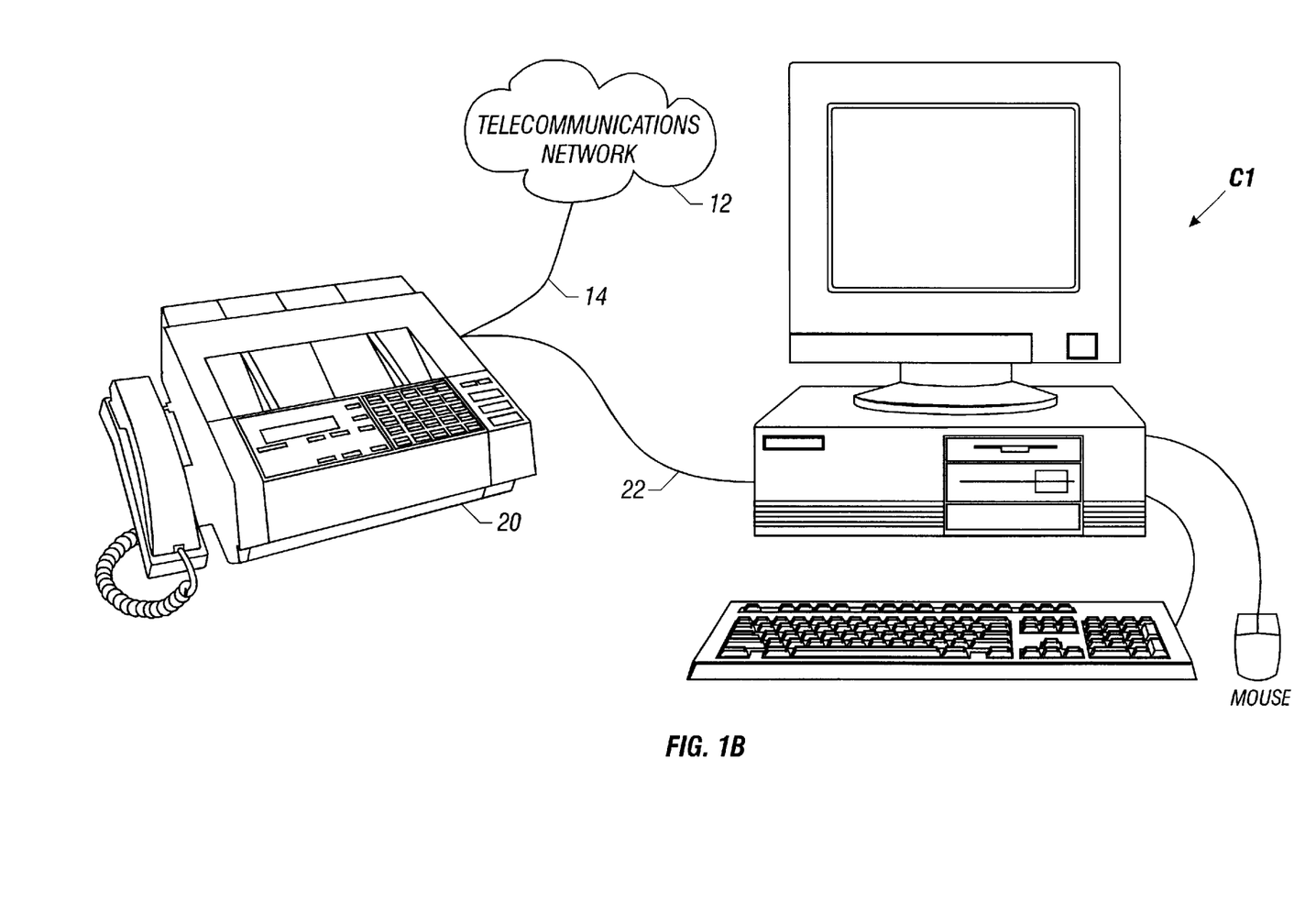
FIG. 1B is a diagrammatical representation of a fax machine or multi-function peripheral attached to a computer system according to a first alternative embodiment.

Referring next to FIG. 1B, there is illustrated a multi-function fax machine 20 (i.e. a fax device) connected to the telecommunications network 12 by a communications line 14 and to a computer system C1 by a communications cable 22 according to a first alternative embodiment. The communications cable 22 is preferably an Institute of Electrical and Electronic Engineers (IEEE) IEEE-1284 compatible parallel interface. Alternatively, the communications cable 22 could be a Universal Serial Bus (USB) cable or other serial or parallel interface. The multi-function fax machine 20 is capable of separately printing, copying and scanning as well as faxing. The computer system C1 may communicate with the multi-function fax machine 20 to electronically provide documents for faxing or to electronically receive fax images received by the multi-function fax machine 20.

Figure 1C:
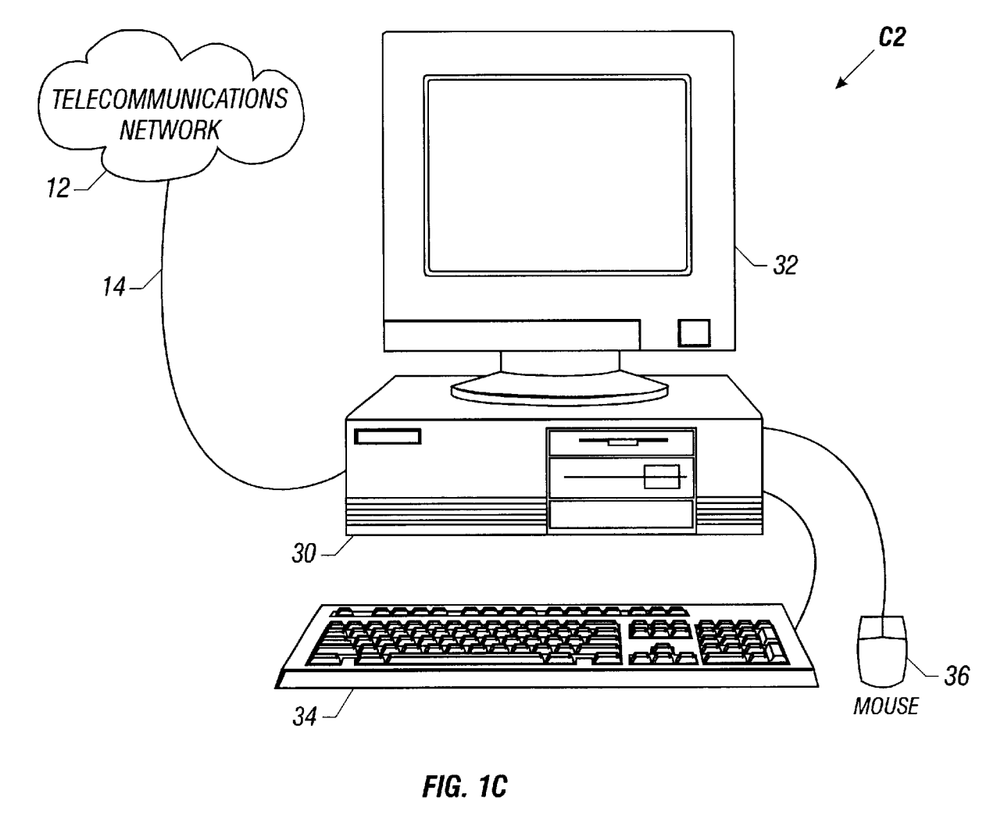
FIG. 1C is a diagrammatical representation of a computer system having fax capabilities according to a second alternative embodiment.

Referring next to FIG. 1C, there is illustrated a computer system C2 having internal circuitry for receiving and sending faxes. The computer system C2 is comprised of a central processing unit ("CPU") 10 housing processing, memory, communications, interface, and other circuitry as described more fully below. CPU 10 is connectable to a monitor 12 for displaying graphical information to a user of the system. A keyboard 14 is also connectable to the CPU 10 with a standard PS/2 style connector for inputting data. Additional input devices, such as a pointing device (e.g.,.mouse) 36 are coupled to CPU 10, providing additional input capabilities. With the computer system C2, received faxes may be sent to an external printer (not shown) or stored on a disk drive.

While the computer systems C1 and C2 shown are of an International Business Machines ("IBM") PC variety, the principles of the present invention are equally applicable to other computer platforms or architectures. Preferably the computer system operates with a Microsoft Windows operating system, such as Windows 95, 98 or NT. Other operating systems could also be used with the present invention.

A fax application such as WinFax by Symantec Corporation may also be used to provide a fax user interface and additional management capabilities. Such an application is not required for the present invention, although the features of the present invention may be integrated and supported by such an application. It is understood that WinFax is compatible with caller ID to present the user with information about the source of the call.

Figure 2:
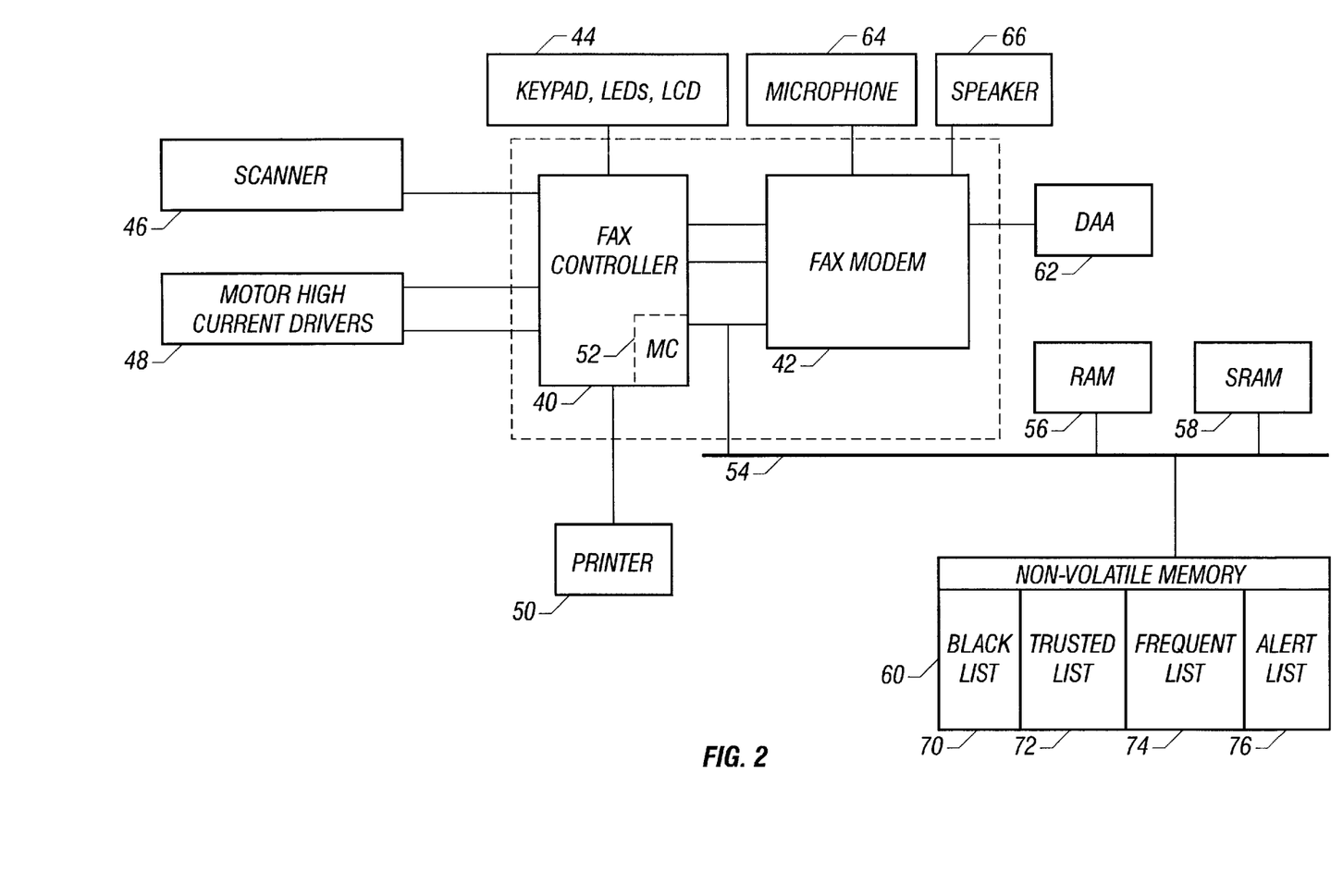
FIG. 2 is a block diagram of the fax machine of FIGS. 1A and 1B.

Turning now to FIG. 2, there is illustrated an exemplary block diagram of the circuitry of the fax machines of FIG. 1A and 1B. Although the fax machines of FIGS. 1A and 1B are slightly different in their features, the circuitry is essentially the same for purposes of the present invention. The core logic or "fax engine" for the fax machines 10 and 20 includes a fax controller 40 and a fax modem 42, such as a Rockwell FE100.

The fax controller 40 acts as the "brain" managing and directing the appropriate processing for fax, copy, print and scan activities. An integrated microcontroller 52 provides a bus 54 for communicating with the fax modem 42 and external memory, such as read only memory (ROM) 56, static random access memory (SRAM) 58 and non-volatile memory 60. The ROM 56 is used to store boot code and other programs not subject to change. The SRAM 58 is used for temporary program and data storage. The non-volatile memory 60 is used to store lists of caller information helpful for blocking incoming calls, including a "black list" 70, "trusted list" 72, "frequent list" 74, and an "urgent list" 76. The non-volatile memory 60 may include Flash ROMs, electrically erasable programmable read only memory (EEPROM) and disk drives.

Other memory arrangements are possible. For example, the ROM 56 could be replaced entirely by Flash ROM, and the SRAM 58 could be replaced with dynamic random access memory (DRAM). Memory 60 is preferably non-volatile memory, such as Flash ROM or EEPROM. Alternatively, the memory 60 could be implemented with battery backed DRAM or SRAM. Other variations including hard disk drives or writable CD-ROMs are also possible.

The fax controller 40 also connects to a keyboard and liquid crystal display (LCD) 44, scanner device 46, stepper motor 48 and printer device 50.

The black list 70 is a list of phone numbers that will be blocked from completing faxes. The trusted list 72 is a list of phone numbers that will always be able to complete faxes. The frequent list 74 is a list of frequent callers. These frequent caller phone numbers are not trusted and not yet black listed. Frequent callers may be moved to the black list when certain thresholds are reached, as described below. Finally, the urgent list is a list phone numbers with corresponding actions, such as a forwarding number, pager number, voice number, mobile number or email address. When a fax is received from a phone number on the urgent list, one or more of the actions may be taken. At least one action is present for each urgent number. It is noted that while the above lists preferably include phone numbers, alternatively the lists could include names corresponding to the phone numbers instead of phone numbers. For simplicity, hereinafter the description with refer to just phone numbers.

The fax modem 42 preferably supports the International Telecommunications Union (ITU) V.17 and V.29 standards for fax transmission and reception. The modem can operate over the public switched telephone network (PSTN) through a line terminator provided by a data access arrangement (DAA) 62. The fax modem 42 also connects to a microphone 64 and speaker 66.

Figure 3A:
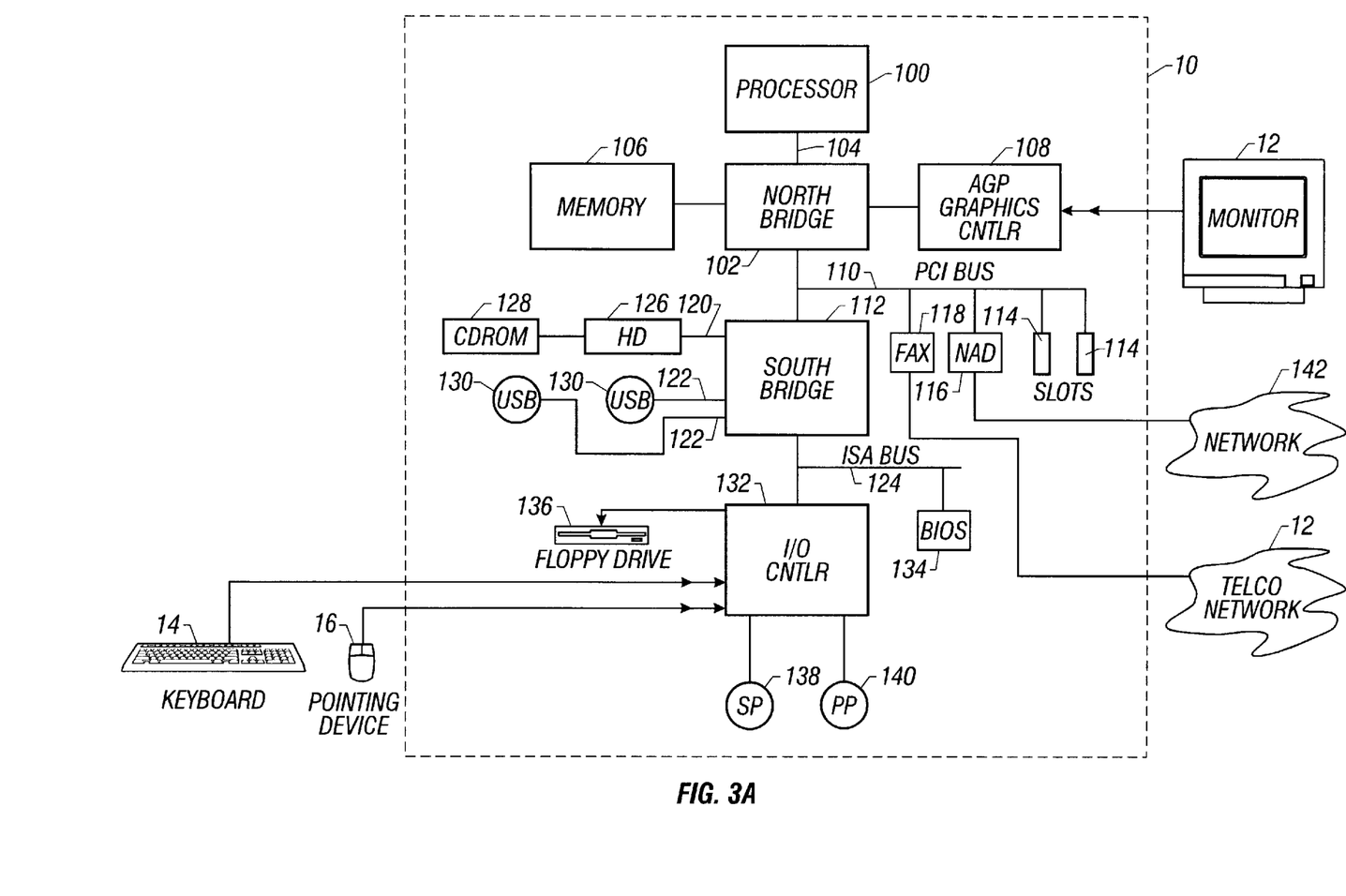
FIG. 3A is a block diagram of the computer system of FIG. 1C.

Turning now to FIG. 3A, there is illustrated an exemplary block diagram of the computer system C2 of FIG. 1C. As is conventional in the art, the computer system C2 includes a processor 100, such as an Intel® Pentium® II microprocessor or the like. It is understood that alternate processors from Intel, AMD®, Cyrix®, Digital™ (Alpha®) and others may be used. The processor 100 is coupled to a north bridge 102 by a host or processor bus 104. The north bridge 102 includes a memory controller for coupling to an array of memory (e.g. dynamic random access memory "DRAM") 106, an Accelerated Graphics Port ("AGP") interface for coupling to an AGP graphics controller 108, and a Peripheral Component Interconnect ("PCI") interface for providing a PCI bus 110. The AGP graphics controller is further connectable to the monitor 12.

In the computer system C2, the PCI bus 110 couples the north bridge 102 to a south bridge 112 and one or more PCI slots 114 for receiving expansion cards (not shown). Further attached to the PCI bus 110 is a network access device ("AND") 116, such as a network interface card or modem for connecting to a network 142, and a fax modem 118 (i.e. fax device) for connecting to the telecommunications network 12.

The south bridge 112 is an integrated multifunctional component, such as the Intel 82371AB, that includes a number of functions, such as, an enhanced direct memory access ("DMA") controller; interrupt controller; timer; integrated drive electronics ("IDE") controller for providing an IDE bus 120; a universal serial bus ("USB") host controller for providing a universal serial bus 122; and an industry standard architecture ("ISA") bus controller for providing an ISA bus 124. The IDE bus 120 supports up to four IDE devices, such as a hard disk drive 126 and a compact disk read only memory ("CD-ROM") 128. The universal serial bus 122 is connected to a pair of USB connectors 130 for communicating with USB devices (not shown).

In the illustrated computer system C2, the ISA bus 124 couples the south bridge 112 to a multifunction input/output (I/O) controller 132 and a basic input/output system (BIOS) ROM 134. The multifunction I/O controller 132, such as a Standard Microsystems Corporation FDC37C68x, includes a number of functions, such as a floppy disk drive controller for connecting to a floppy disk drive 136; a keyboard controller for connecting to the keyboard 14 and the pointing device 16; a serial communications controller for providing at least one serial port 138; and a parallel port interface for providing at least one parallel port 140. Alternative multifunction input/output (I/O) controllers are manufactured by National Semiconductor and WinBond. The functions described above may alternatively be implemented in separate integrated circuits or combined differently than described above without departing from the concept of the present invention.

Computer system C2 is also adapted for connection to a network, such as the internet, designated generally by reference number 142, through the network access device 116. Connection with the network may be made with various alternative configurations, including, but not limited to, conventional telephone wire, integrated service digital network ("ISDN"), digital subscriber lines ("DSL"), and wireless communications.

Figure 3B:
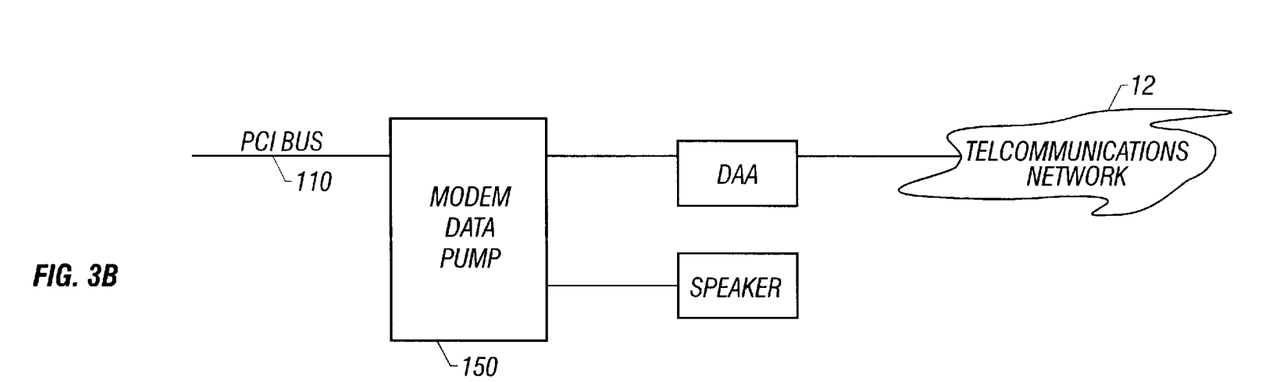
FIG. 3B is a block diagram of the fax circuit of FIG. 3A.

Turning now to FIG. 3B, there is illustrated a block diagram of the fax circuit 118 of FIG. 3A. A fax/modem data pump 150, such as a Rockwell R288F, is connected to the PCI bus 110, a data access arrangement (DAA) 152 and a speaker 154. A soft fax/modem may also be used, in which much of the processing functionality of the fax/modem data pump 150 would be performed by the processor 100, as is well known to those of ordinary skill in the art.

Figure 3C:
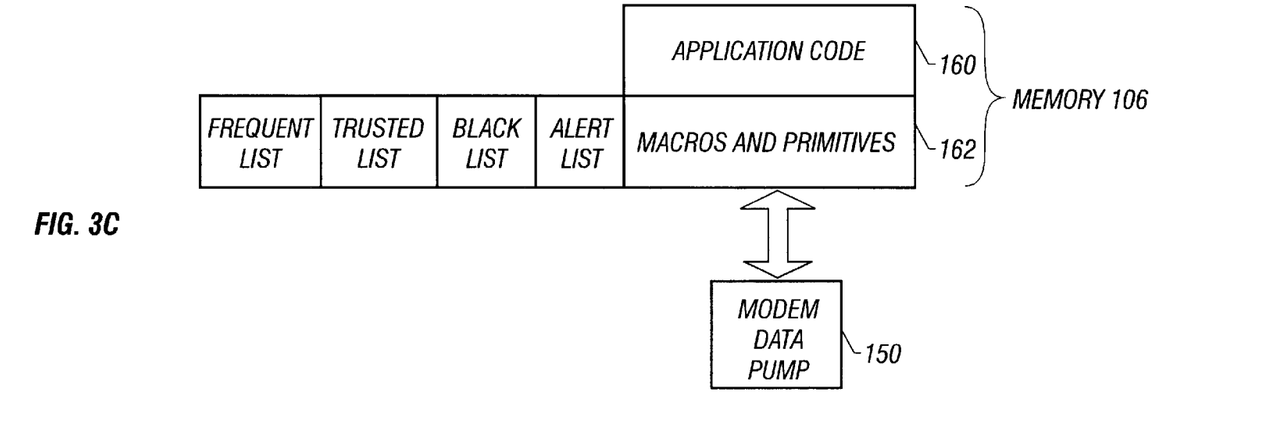
FIG. 3C is a software architecture diagram of the fax modem depicted in FIG. 2.

Referring now to FIG. 3C, there is illustrated a software architecture diagram of the fax circuit 118. A software application 160 resides in memory 106 and is executed by the processor 100 for communicating command and control information to the fax/modem 150 via the PCI bus 110. A library of macros and primitives 162 may be called by the software application to handle certain low-level functions with the fax/modem data pump. The fax/modem data pump 150 signals the processor 20 via an interrupt when its data buffer is full or empty during a data transfer.

Figure 4A:
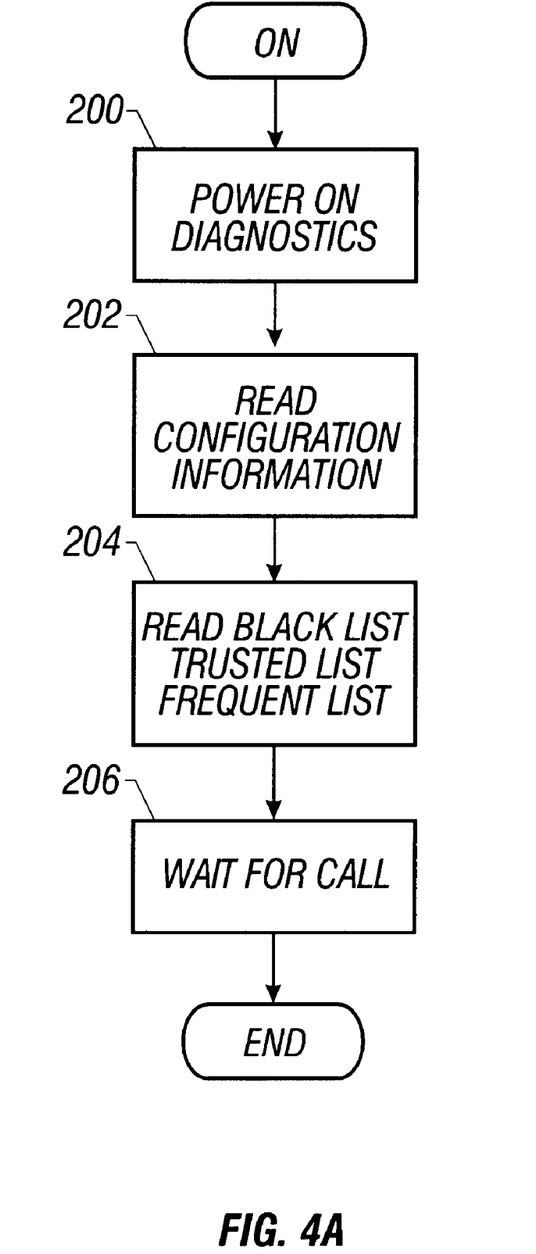
FIGS. 4A–B are flowcharts illustrating a method of selectively blocking incoming faxes.
Figure 4B:
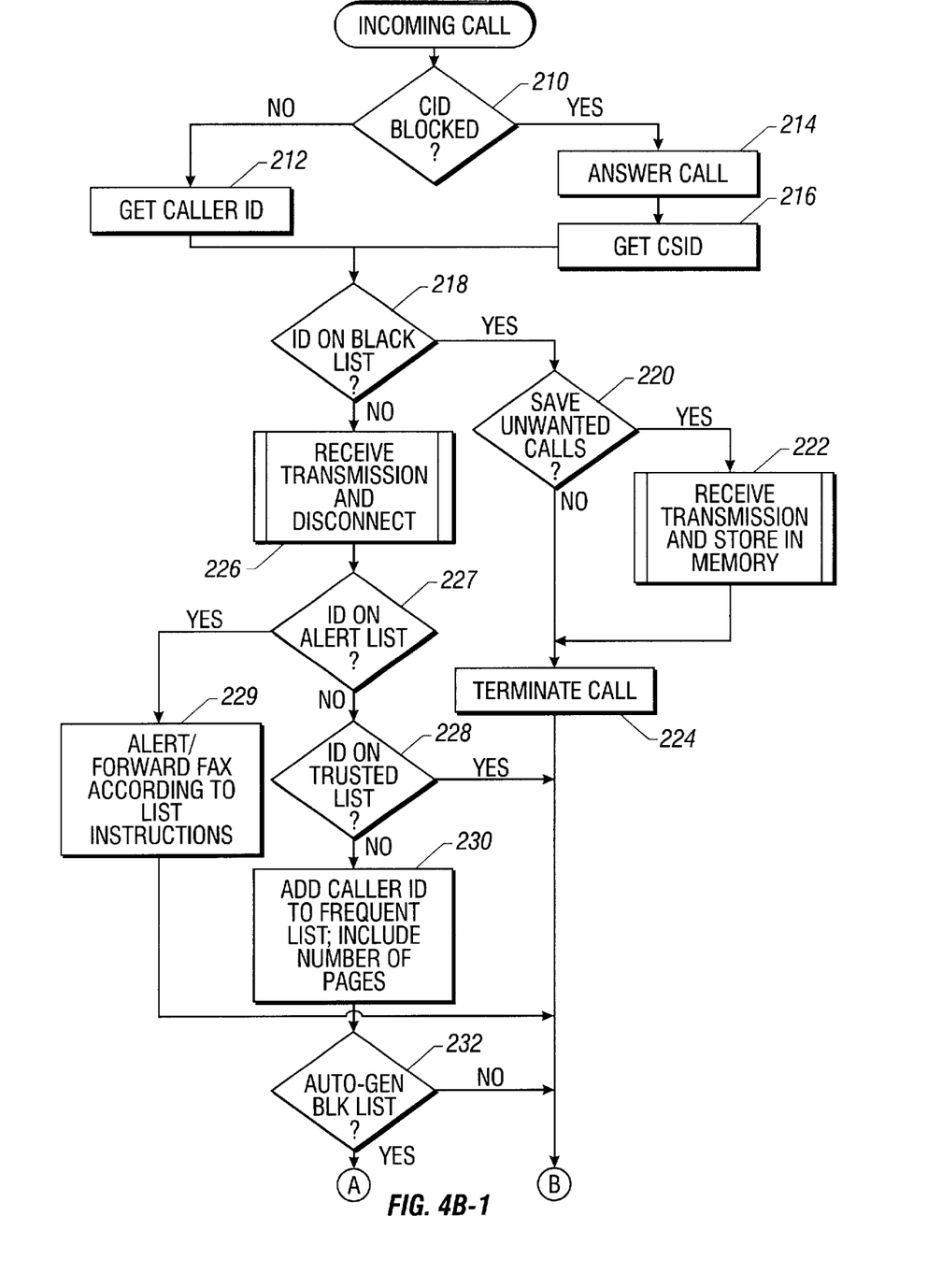
Figure 4B:
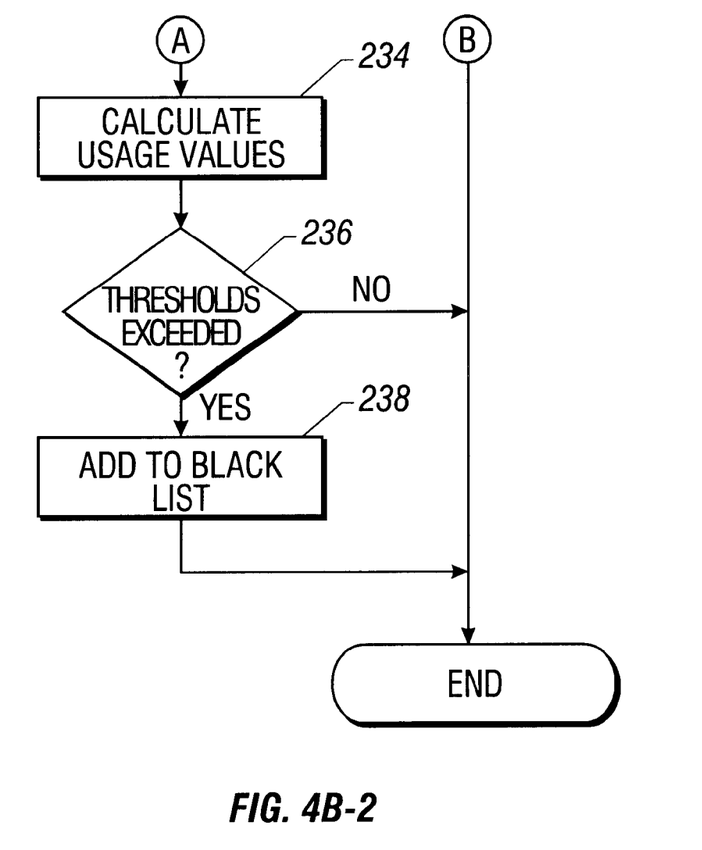

The above-described embodiments will now be described with respect to the call blocking features of the present invention. Turning now to FIGS. 4A–B, there is illustrated flow diagrams representing a method of blocking calls according to the preferred embodiment. The diagrams are explained with reference to the architecture of FIG. 2 which includes a microcontroller 40 that is capable of reading and writing information to the non-volatile memory 60. It is understood that the same method is applicable to the alternative embodiments. For example, with the second alternative embodiment the microcontroller 40 is replaced by the host processor 100 and non-volatile memory 60 is replaced by disk drive 126 so that in the computer system C2 the fax controller 118 is operated by the processor 100 in conjunction with an application 160. If a soft fax/modem is used in one of the alternatives, it is understood that the processing will be handled by a main processor (e.g. processor 100) instead of the fax controller (e.g. fax controller 40). One of ordinary skill in the art can easily adapt the methods disclosed herein to any of the above embodiments and other fax configurations desired.

After power is applied to the fax 10 the fax controller 40 performs power-on diagnostics to verify that the machine is operable. At a step 202, the fax controller 40 reads configuration information from the memory 60, such as button pre-sets and default settings.

At a step 204, the fax controller 40 reads information from the non-volatile memory 60 for blocking calls, including the black list 70, the trusted list 72, and the frequent list 74. The black list 70 is a list of phone numbers that are prevented from completing a fax. Optionally, the black list 70 may include the name corresponding to the phone number. The trusted list 72 is a list of phone numbers that are allowed to complete faxes and prevented from being added to the black list 70. The frequent list 72 is a list of frequently received calls. The frequent list includes phone number, date, time, and number of pages of each call received by the fax machine 10. The frequent list may be developed by storing the last 100 or so calls or storing only the most frequent calls. At step 206, the fax machine 10 waits for an incoming call. Alternatively, the reading of the black list 70, the trusted list 72, and the frequent list 74 may be deferred until actually needed.

Referring now to FIG. 4B, there is illustrated a series of steps corresponding to the actions taken upon receipt of an incoming call. At step 210, the fax machine 10 responds to the incoming call based on whether the Caller ID has been blocked by the caller. A caller may configure his phone line to block caller ID information, which will prohibit the receipt of the caller's phone number, and possibly, his name. The caller ID information is sent in the 4-second silent period between the first and second rings. The caller ID information is provided by the local phone company and includes the date, time, number and optional name of the calling party to the called party (fax machine 10).

If the caller ID information is not blocked, the fax controller 40 receives the caller ID information. If the caller ID information is blocked, a second blocking system may be enabled using a calling station identifier (CSID) (i.e. alternative caller identification information). According to telecommunications standards, the beginning of a telephone call includes a packet of information that includes the calling parties name and phone number. The phone number may include both a voice and fax number. Either number could be used, but it is preferable to use the fax number. Alternatively, as described below, the name field could be used. If the CID information is blocked, at step 214 the fax controller 40 answers the call to receive the CSID information at step 216. It is noted here that provided caller ID information is not blocked, caller ID has the advantage of not requiring the call to be answered to receive the calling party's information.

At step 218, the fax controller 40 compares the incoming phone number with the phone numbers in the black list 70. If there is a match, the call may be terminated or quietly stored in memory without printing. If there is not a match, the call will be received.

It is preferable to terminate the unwanted calls to avoid tying up the phone line with unwanted calls. Alternatively, a more conservative option is provided for the user in which incoming faxes are stored in memory. The user is then able to manually view a list of unwanted calls to determine whether the fax should be printed or discarded.

At step 220, fax controller checks to see which option is selected. If calls should be saved, the fax controller 40 at step 222 receives the call and stores the fax in memory 58. Other alternative memory sources are possible. Only the most recent faxes are saved according to the amount of available memory.

If unwanted calls are not to be saved, then at step 224 the fax controller 40 terminates the call. Calls may be terminated in a number of ways. If the incoming call includes the caller ID information, then preferably the call is terminated by quickly answering and disconnecting the call so that the telephone line is quickly available. As an alternative, the fax controller 40 could refuse to answer the incoming call. If the caller ID information was not present and the call was answered in step 214 then the call is simply disconnected in step 224. As a further variation to step 224, the fax device can automatically generate a return fax message to the refused caller with a suitable message to indicate that faxes from this number are being refused.

Returning back to step 218, there is an alternative method of comparing the incoming phone number with the phone numbers in the black list 70. Alternatively, the fax controller 40 can compare the name of the calling party with names in the black list. The same actions described above would occur depending on whether or not a match is found.

If at step 218 there is not a match found, the fax controller 40 at step 226 will receive the fax transmission, disconnect the call and send the output to the printer 50 according to conventional techniques.

Once the fax transmission is completed, at step 227 the fax controller 40 compares the incoming phone number with numbers in the alert list 76. If there is a match, the action described in the alert list is taken at step 229. For example, the alert list may instruct the fax controller 40 to forward to fax to another number or send an email indicating that a fax has been received.

If there is not a match at step 227, the process continues to step 228 where the fax controller 40 compares the incoming phone number with numbers in the trusted list 72. If there is not a match at step 228, then the incoming phone number may be added to the frequent list 74. If there is a match at step 228, then the incoming phone number will not be added and the fax controller 40 returns to loop and waits for another call. If there is not a match, the process continues from step 228 to step 230 where the date, time and number of the incoming phone call is stored in the frequent list 74.

The fax machine 10 may be configured to automatically add incoming phone numbers to the black list 70. This setting would preferably be stored with the other configuration settings retrieved at step 202. At step 232, the fax controller 40 determines if this feature is desired. If not so, then the fax controller 40 returns to wait for another call. If the black list 70 is to be automatically generated, the process continues to step 234 where the fax controller 40 calculates usage values. Usage values may be determined based on any one factor or any combination of the factors. Preferably, usage values are determined based on the frequency of the call, time of the call and number of pages transmitted. An example for calculating usage values is set forth below. At step 236, the fax controller 40 determines whether a threshold has been exceeded. If so, the incoming phone number is added to the black list 70 at step 238. If the threshold has not been reached, then the fax controller 40 waits for the next call.

One example for generating a usage value is to assign a multiplier to each factor based on its significance as shown in Table I.

TABLE I

| Multipliers | |
|---|---|
| Reoccurring - business daily | 8 |
| Reoccurring - once a week | 4 |
| Reoccurring - once a month | 2 |
| Time - office hours | 2 |
| Time - off-hours | 1 |

TABLE I-continued

Multipliers

| | |
|---|---|
| Pages - 2 or less | 1 |
| Pages - 5 or less | 2 |
| Pages - more than 5 | 3 |

Occurrence or frequency, is determined based on the date and time of the call. If the call is made within a certain window, such as 2–4 hours, then the call is designated as a reoccurring call. Then, each occurrence in the frequent list 74 is given a usage number based on the multipliers, as shown in Table II.

TABLE II

| Phone # | Date | Time | Pages | Usage |
|---|---|---|---|---|
| 123-456-7890 | 1/4/99 | 12:05 am | 1 | 8*1*1 = 8 |
| 123-456-7890 | 1/5/99 | 1:06 am | 1 | 8*1*1 = 8 |
| 123-456-7890 | 1/6/99 | 12:88 am | 1 | 8*1*1 = 8 |
| 123-456-7890 | 1/7/99 | 1:20 am | 1 | 8*1*1 = 8 |
| 123-456-7890 | 1/8/99 | 11:06 pm | 1 | 8*1*1 = 8 |
| Total Usage for 123-456-7890 40 | | | | |

If the total usage value for the phone number exceeds a threshold, such as 100, the call is placed onto the black list 70 according to the automatic configuration setting. It should be apparent to anyone of ordinary skill in the art that there are many different ways to calculate usage number. Different multipliers may be used or absolute numbers may be used instead. The determination of a reoccurring phone number can be calculated with different windows and across a wider or narrower number of days. A more sophisticated calculation could be used to recognize that a weekly transmission may not occur on the same date and time.

Furthermore, if the calls are not automatically placed onto the black list 70, the fax controller 40 could be instructed to print out the black list for an operator to determine manually which numbers should be added to the black list 70. The numbers could then be keyed into the fax machine 10 manually for entry onto the black list 70.

Thus, there has been described and illustrated herein, a method and apparatus for blocking unsolicited faxes to a fax machine. However, those skilled in the art should recognize that many modifications and variations in the size, shape, materials, components, circuit elements, wiring connections and contacts besides those specifically mentioned may be made in the techniques described herein without departing substantially from the concept of the present invention. Accordingly, it should be clearly understood that the form of the invention described herein is exemplary only and is not intended as a limitation on the scope of the invention.

What is claimed is:

1. A fax device, comprising:
    a memory for storing caller identification information including a list of trusted caller identification information and a list of frequent caller identification information; and
    a controller coupled to the memory, the controller operable to respond to caller identification information associated with an incoming call received from a network and based on a comparison with caller identification information stored in said memory, to determine to accept or to reject the incoming call, said controller further operable to add incoming caller information automatically to a list of frequent caller identification information if not present in the list of trusted caller identification information, and automatically to add incoming caller identification information to a list of blocked caller identification if that incoming caller information is not present in the list of trusted caller identification information and if a usage value associated with that incoming caller identification information derived from said list of frequent caller identification information exceeds a predetermined threshold value.

2. The fax device of claim 1,
    wherein the controller is operable to terminate the incoming call if the incoming caller identification information from the network matches blocked caller information stored in the memory.

3. The fax device of claim 1,
    wherein the controller is operable to answer and then promptly disconnect the call if the incoming caller identification from the network matches blocked caller information stored in the memory.

4. The fax device of claim 1,
    wherein the controller is operable to answer the call and process an incoming fax transmission if the incoming caller identification information from the network does not match blocked caller information stored in the memory.

5. The fax device of claim 1,
    wherein the list of frequent caller identification information includes information about each incoming call, including telephone number, date of call, time of call and number of pages of fax transmission received, and
    wherein the usage value is determined at least on the number of incoming calls during a predetermined period associated with that incoming caller identification information.

6. The fax device of claim 1,
    wherein the stored caller identification information further includes a list of urgent caller identification information and at least one action to be taken in response to an incoming call including caller identification information corresponding to stored urgent caller identification information, and
    wherein the controller is operable to initiate said at least one action in response to an incoming call including caller identification information corresponding to stored urgent caller identification information.

7. The fax device of claim 6,
    wherein said at least one action includes forwarding the call, calling a pager, calling a voice mailbox, calling :a mobile phone and sending an email.

8. A method of handling faxes, comprising:
    developing and storing caller identification information including a list of trusted caller identification information and a list of frequent caller identification information;
    receiving caller identification information associated with an incoming call from a network; and
    determining to accept or to reject the incoming call based on comparison of said received caller identification information with the stored list of caller identification information;
    adding the received caller identification information of the incoming call to the stored list of frequent caller identification information If the, incoming caller identification information received from the network is not present in the stored list of trusted caller identification information; and adding the caller identification information of the incoming call to the list of blocked caller identification information if the incoming caller identification information received from the network is not present in the stored list of trusted caller identification information and a usage value associated with that incoming caller Identification exceeds a predetermined threshold value.

9. The method of claim 8, wherein the determining step comprises:

refusing to answer the call if the received caller identification information from the network matches information in the stored list of blocked caller identification information.

10. The method of claim 8, wherein the determining step comprises:

answering and promptly disconnecting the call if the received caller identification from the network matches information in the stored list of blocked caller identification information.

11. The method of claim 8, wherein the determining step comprises:

answering and processing the call if the received caller identification from the network does not match information in the stored list of blocked caller Identification information.

12. The method of claim 8, wherein the usage value is determined based on the caller identification contained in the stored list of frequent caller identification information, including caller telephone number, date of call, time of call and number of pages of fax transmission received.

13. The method of claim 8, wherein the stored list of caller identification information further includes a list of urgent caller identification information and at least one action to be taken in response to an incoming call including caller identification information corresponding to stored urgent caller Identification information, and wherein the determining step comprises:

processing an incoming call including caller identification information that matches information in the stored list of urgent caller identification information callers, according to the at least one action associated with the matched urgent caller Identification information.

14. A computer system for connecting to a network to receive calls, comprising:

a processor;

a memory for storing caller identification information including a list of trusted caller identification information and a list of frequent caller identification information and a fax device operable to receive caller identification information from the network corresponding to an incoming call and coupled to the memory and the processor to enable a determination to accept or to reject the incoming call based on a comparison with caller identification information stored in the memory, said fax device further operable to add incoming caller identification information to the list of frequent caller identification information if not present in the list of trusted caller identification information; and said fax device is also operable to add incoming caller identification information to the list of blocked caller identification information if not present in the list of trusted caller identification information and a usage value associated with that incoming caller identification information exceeds a predetermined threshold value.

15. The computer system of claim 14, wherein the fax device is operable to terminate the incoming call if the incoming caller identification information from the network matches blocked caller information stored in the memory.

16. The computer system of claim 14, wherein the fax device is operable to answer and then promptly disconnect the call if the incoming caller identification from the network matches blocked caller information stored in the memory.

17. The computer system of claim 14, wherein the fax device is operable to answer the call and process an incoming fax transmission if the incoming caller identification information from the network does not match blocked caller information stored in the memory.

18. The computer system of claim 14, wherein the list of frequent caller identification information includes information about each incoming call, including telephone number, date of call, time of call and number of pages of fax transmission received, and wherein the usage value is determined at least on the number of incoming calls during a predetermined period associated with that incoming caller identification information.

19. The computer system of claim 14, wherein the stored caller identification information also includes a list of urgent caller identification information and at least one action to be taken in response to an incoming call including caller identification information corresponding to stored urgent caller identification information, and wherein the fax device is operable to initiate said at least one action in response to an incoming call including caller identification information corresponding to stored urgent caller identification information.

20. The computer system of claim 19, wherein said at least one action includes forwarding the call, calling a pager, calling a mailbox, calling a mobile phone and sending an email.

21. A computer system according to claim 14, wherein the fax device includes a soft fax/modem.

22. A fax device, comprising:

a memory for storing caller identification information including a list of blocked caller identification information, and further lists including a list of trusted caller identification information, a list of frequent caller identification information, and a list of urgent caller identification information; and a controller coupled to the memory, the controller operable to respond to caller identification information associated with an incoming fax transmission received from a network and based on a comparison with caller identification information stored in said memory, to process said incoming fax transmission if the incoming caller information from the network does not match stored blocked caller information, said processing including determining to accept or to reject the incoming fax transmission, said controller further operable to initiate automatically a transmission to a predetermined destination in response to an accepted incoming fax transmission including caller identification information corresponding to stored urgent caller information; and wherein the controller is operable to add incoming caller identification information to the list of blocked caller identification information if not present in the list of trusted caller identification information and a usage value associated with that incoming caller identification information is exceeded.

23. The computer system of claim 22, wherein the controller is operable to terminate the incoming call if the incoming caller identification information from the network matches blocked caller information stored in the memory.

24. The computer system of claim 22, wherein the controller is operable to answer and then promptly disconnect the call if the incoming caller identification from the network matches blocked caller information stored in the memory.

25. The computer system of claim 22, wherein the controller is operable to add incoming caller identification information to the list of frequent caller identification information if not present in the list of trusted caller identification information.

26. The computer system of claim 22, wherein the list of frequent caller identification information includes information about each incoming call, including telephone number, date of call, time of call and number of pages of fax transmission received, and wherein the usage value is determined at least on the number of incoming calls received during a predetermined period associated with that incoming caller identification information.

27. A fax device, comprising:

means for storing caller identification information including a list of trusted caller identification information and a list of frequent caller identification information;

means for receiving caller identification information from a telecommunications network associated with an incoming call; and means for determining to accept or to reject the incoming call based comparison of the received caller identification information with the stored caller identification information;

means for adding incoming caller information automatically to a list of frequent caller identification information if not present in the list of trusted caller identification information, and means for automatically adding incoming caller identification Information to a list of blocked caller identification if that incoming caller information is not present in the list of trusted caller identification information and if a usage value associated with that incoming caller identification information derived from said list of frequent caller identification information exceeds a predetermined threshold value.

28. The fax device of claim 27, wherein the means for determining is operable to terminate the incoming call if the incoming caller identification information from the telecommunications network matches blocked caller information stored in the memory.

29. The fax device of claim 27, wherein the means for determining is operable to answer and then promptly disconnect the call if the incoming caller identification from the telecommunications network matches blocked caller information stored in the memory.

30. The fax device of claim 27, wherein the means for determining is operable to answer the call and process an incoming fax transmission if the incoming caller identification information from the telecommunications network does not match blocked caller information stored in the memory.

31. The fax device of claim 27, wherein the stored caller identification information further includes a list of urgent caller identification information and at least one action to be taken in response to an incoming call. including caller identification information corresponding to stored urgent caller identification information, and wherein the means for determining is operable to initiate said at least one action in response to an incoming call including caller identification information corresponding to stored urgent caller identification information.

* * * * *